United States Patent
Cremona et al.

(10) Patent No.: US 8,809,224 B2
(45) Date of Patent: Aug. 19, 2014

(54) CATALYST FOR THE DECOMPOSITION OF NITROGEN PROTOXIDE

(75) Inventors: Alberto Cremona, Castell'Arquato (IT); Marvin Estenfelder, Ebersberg (DE); Edoardo Vogna, Novara (IT)

(73) Assignee: Sud-Chemie Catalysts Italia S.R.L., Novara (IT)

( * ) Notice: Subject to any disclaimer, the term of this patent is extended or adjusted under 35 U.S.C. 154(b) by 0 days.

(21) Appl. No.: 13/822,880

(22) PCT Filed: Sep. 6, 2011

(86) PCT No.: PCT/EP2011/065393
§ 371 (c)(1),
(2), (4) Date: Mar. 13, 2013

(87) PCT Pub. No.: WO2012/034902
PCT Pub. Date: Mar. 22, 2012

(65) Prior Publication Data
US 2013/0172178 A1    Jul. 4, 2013

(30) Foreign Application Priority Data

Sep. 13, 2010 (IT) .............................. MI2010A1659

(51) Int. Cl.
*B01J 23/32* (2006.01)

(52) U.S. Cl.
USPC ........... 502/324; 502/302; 502/303; 502/304; 502/325; 423/239.1; 423/594.5; 423/594.19; 423/605

(58) Field of Classification Search
USPC ............... 502/302–304, 325, 324; 423/239.1, 423/594.5, 594.19, 605
See application file for complete search history.

(56) References Cited

U.S. PATENT DOCUMENTS

2004/0179986 A1    9/2004  Burckhardt et al.

FOREIGN PATENT DOCUMENTS

| DE | 19506659 C1 | 8/1996 |
| EP | 2 202 201 A1 | 6/2010 |
| GB | 2 059 934 A | 4/1981 |
| JP | 2005-095786 A | 4/2005 |
| WO | WO 2004/096703 A2 | 11/2004 |
| WO | WO 2008/090450 A1 | 7/2008 |

OTHER PUBLICATIONS

Karaskova, K. et al., "Effect of promoters in Co-Mn-Al mixed oxide catalyst on N2O decomposition", Chemical Engineering Journal (2010), vol. 160, No. 2, pp. 480-487.
Russo, Nunzio et al., "N2O Catalytic Decomposition Over Various Spinel-Type Oxides", Catalysis Today (2007), vol. 119, No. 1-4, pp. 228-232.
Xue, Li et al., "Catalytic Decomposition of N2O Over CeO2 Promoted Co3O4 Spinel Catalyst", Applied Catalysis B: Environmental (2007), vol. 75, No. 3-4, pp. 167-174.
Obalova, L. et al., "Effect of potassium in calcined Co-Mn-Al layered double hydroxide on the catalytic decomposition of N2O", Applied Catalysis B: Environmental (2009), vol. 90, pp. 132-140.
International Search Report dated Dec. 15, 2011 issued in PCT/EP2011/065393.

*Primary Examiner* — Kaj K Olsen
*Assistant Examiner* — Pritesh Darji
(74) *Attorney, Agent, or Firm* — Scully, Scott, Murphy & Presser, P.C.

(57) ABSTRACT

A catalyst for removing nitrogen protoxide from gas mixtures which contain it, comprising mixed oxides of cobalt, manganese and rare earth metals having composition expressed as percentage by weight of CoO, MnO and transition metal oxide in the lowest state of valence as follows: MnO 38-56%, CoO 22-30%, rare earth metal oxide 22-32%.

12 Claims, No Drawings

CATALYST FOR THE DECOMPOSITION OF NITROGEN PROTOXIDE

TECHNICAL FIELD

The present invention relates to a catalyst for the catalytic decomposition of nitrogen protoxide ($N_2O$) to nitrogen and oxygen, and to its use for the removal of the protoxide from gas mixtures which contain it, particularly for removing the emissions of nitric acid and adipic acid plants.

BACKGROUND ART

Nitrogen protoxide is a harmful greenhouse gas that is much more powerful than carbon dioxide; moreover, in the stratosphere it takes part in the reactions that lead to the destruction of the ozone layer.

The main industrial sources for the formation of nitrogen protoxide are plants for the production of nitric acid and adipic acid (monomer used in the preparation of nylon 6,6 and 6,12).

Nitrogen protoxide is present in the emissions of adipic acid plants in considerable amounts: a typical composition comprises, in percentage by volume: 30% $N_2O$, 2% $CO_2$, 2.5% $H_2O$, 8-12% $O_2$, 50-150 ppm NOx, remainder $N_2$.

The emissions of nitric acid plants generally contain 300-1700 ppm of $N_2O$, 100-2000 ppm of $NO_x$, 1-4% $O_2$, and nitrogen as the remainder.

$N_2O$ emission from nitric acid and adipic acid plants is expected to grow by approximately 16% in the period 2005-2020.

Several catalysts used for the decomposition of $N_2O$ are known. The main ones are constituted by noble metals supported on metallic oxides of different kinds, zeolites substituted with transition metal ions or on which metal oxides and anionic clays are supported, such as for example hydrotalcites constituted by mixed hydroxides with stratified structure, in which anions of different kinds, exchangeable or not, and water molecules are inserted between two layers.

All these catalysts suffer the drawback that they are not thermally stable: the noble metals supported on metal oxides because at high temperatures the particles of the metal tend to sinter, with consequent deactivation of the catalyst; clays and zeolites because their structure tends to collapse and thus lose the initial catalytic properties.

Catalysts are known (U.S. Pat. No. 5,705,136) which are constituted by oxides such as MnO, CuO, NiO and CoO supported on MgO, CaO, ZnO, $TiO_2$, $Al_2O_3$—ZnO, $Al_2O_3$—$TiO_2$ and the like. Preferably, the catalysts contain CoO supported on MgO.

$N_2O$ conversions are high.

US 2004/0179986 A1 mentions a catalyst of $N_2O$ decomposition that is active at temperatures between 250 and 450° C. but inactive at higher temperatures and is constituted by a mixture, in equal parts by weight, of a $Co_3O_4$ spinel and an anion defect perovskite of formula $La_{1-x}Cu_xCoO_{3-d}$ ($x \leq 0.5$).

The US application stresses that the perovskite-like catalysts undergo deactivation when used at high temperatures (700° C.-1000° C.) if supported on alumina caused by deactivation reactions of alumina with the active catalyst phase.

Structures of the type of hydrotalcite, such as for example $Cu_3Mg_5Al_2(OH)_{20}CO_33H_2O$, $Mn_3Mg_5Al_2(OH)_{20}CO_3H_2O$, are also usable.

DISCLOSURE OF THE INVENTION

It has now been found unexpectedly that the catalysts specified hereinafter have a high catalytic activity in the decomposition of $N_2O$ to nitrogen and oxygen, satisfactory thermal stability up to 900° C. and the ability to keep their activity unchanged for long periods of time. The stability at high temperatures is in particular provided by the catalysts when supported on alumina, which is a totally unexpected result in view of the away teaching deriving from the US application. Moreover, the catalysts specified hereinafter have the characteristic that they do not contain copper, an element that might have volatility problems in case of reactions conducted at high temperatures, such as for example in the operating conditions for abating of $N_2O$ by-product directly in the reactor for oxidation of ammonia to nitrogen monoxide.

The catalysts comprise mixed oxides of cobalt, manganese and rare earth metals, which are present in the following composition expressed as percentage by weight of CoO, MnO and rare earth metal oxide, wherein the metal is present in the lowest state of valence: MnO 38-56%, CoO 22-30%, 22-32% rare earth metal oxide.

WAYS OF CARRYING OUT THE INVENTION

The preferred rare earth metal oxides are lanthanum and cerium oxides and mixtures thereof.

A preferred composition contains lanthanum oxide in a quantity of 25-30% by weight expressed as $La_2O_3$.

The mixed oxides that constitute the active components of the catalysts have the characteristic of being p-type semiconductors in which conductivity increases exponentially as the temperature rises, according to an Arrhenius-like law, and in which the charge vectors are constituted by electron vacancies. In these oxides, the lattice oxygen takes part in the oxidation reactions.

The mixed oxides are used on porous inorganic supports, preferably porous oxides, such as alumina, silica-alumina, titanium dioxide, magnesium oxide. Alumina, preferably in the gamma form, in the form of microspheroidal particles with a diameter of 30-80 μm, is the preferred support for reactions performed particularly in a fluid bed. The surface area (BET) of the catalyst supported in gamma alumina is generally comprised between 90 and 170 $m^2/g$. The oxides are preferably present in the support in a quantity of 10-30% by weight.

In the fixed-bed reactions used in the removal of nitrogen protoxide from the emissions of nitric acid and adipic acid plants it is preferred to use supports that have a definite geometric shape, such as cylindrical granules having one or more holes, preferably with three lobes, with through holes which are parallel to the axis of the granule. Granule size is 3-10 mm in height and the circumference is comprised between 3 and 10 mm.

For preparing the supported catalysts, the preferred method consists in impregnating the support with an aqueous solution of a salt of lanthanum or cerium or other rare earth metal or mixtures thereof, followed by drying of the support and then calcination at temperatures preferably between 450 and 600° C. The support thus treated is then impregnated with a solution of a salt of manganese and cobalt, subsequently dried and calcinated at temperatures between 500 and 750° C.

Any salt of the above cited metals that is soluble in water can be used; nitrates, formates and acetates are preferred.

The preferred impregnation method is performed dry, i.e., by using a volume of solution of the salts that is equal to, or lower than, the volume of the pores of the support.

The light-off activity of the catalyst, i.e., the temperature of the gaseous flow at which the catalyst decomposes 50% of the nitrogen protoxide that is present, and the temperature of total decomposition of the protoxide were selected as main criteria for evaluating the performance of the catalyst being considered.

The results are listed in the table and relate to tests conducted at different $N_2O$ concentration both on a fresh catalyst and on a catalyst aged for 3 days at 900° C. in air, so as to simulate a worsening of the reaction conditions.

TABLE

| Operating conditions | Unit | Example 1 Fresh sample | Example 2 Aged sample | Example 3 Fresh sample | Example 4 Aged sample |
|---|---|---|---|---|---|
| $N_2O$ | % vol. | 2100 ppmv | 2100 ppmv | 13 | 13 |
| Oxygen | % vol. | 1.5 | 1.5 | 5 | 5 |
| NO | % vol. | 0.8 | 0.8 | — | — |
| Helium | % vol. | remainder | remainder | remainder | remainder |
| Temperatures | | | | | |
| Reaction start | ° C. | 411 | 428 | 410 | 430 |
| 50% conversion | | 509 | 551 | 505 | 550 |
| 100% conversion | | 612 | 650 | 600 | 660 |
| GHSV | $h^{-1}$ | 12500 | 12500 | 12500 | 12500 |
| Total flow-rate | $Ncm^3/min$ | 200 | 200 | 200 | 200 |

The decomposition of $N_2O$ is conducted at temperatures between 400 and 900° C. The higher temperatures are used as the $N_2O$ content increases. In the case of the emission from nitric acid plants, the preferred temperature is between 700 and 900° C.

Space velocities are comprised between 3,000 and 100,000 $h^{-1}$. The $N_2O$ content in the mixtures varies from ppm to percentages by volume of more than 20%. By working in the conditions indicated above, any NOx oxides present remain unchanged.

The following examples are given by way of non-limiting illustration of the invention.

EXAMPLES

The catalyst used in the examples had the following composition, expressed as percentage by weight of:
$La_2O_3$=27.4
MnO=46.3
CoO=26.3

The preparation was performed by impregnating gamma alumina with an aqueous solution of lanthanum nitrate $La(NO_3)_3$.

The support was then dried at 110° C. and then calcinated at 450° C. The calcinated support was impregnated with an aqueous solution of manganese nitrate $(Mn(NO_3)_2)$ and cobalt nitrate $(Co(NO_3)_2)$ and then dried at 120-200° C. and calcinated at 700° C.

A volume of solution equal to 100% of the volume of the pores of the alumina was used for impregnation.

The surface area of the catalyst (BET) was 160 $m^2/g$ and porosity was 0.40 $cm^3/g$.

Prior to the test, the catalyst was ground and screened appropriately.

The disclosures in Italian Patent Application No. MI2010A001659 from which this application claims priority are incorporated herein by reference.

The invention claimed is:

1. Catalyst for removing nitrogen protoxide from gas mixtures which contain it, comprising mixed oxides of cobalt, manganese and rare earth metals having composition expressed as percentage by weight of CoO, MnO and rare earth metal oxide in the lowest state of valence as follows: MnO 38-56%, CoO 22-30%, rare earth metal oxide 22-32%.

2. The catalyst according to claim 1 used in the removal of nitrogen protoxide present in the emissions of plants for the production of nitric acid and adipic acid.

3. The catalyst according to claim 1 wherein the gaseous mixtures containing the nitrogen protoxide are contacted with the catalysts at temperatures between 400° and 900° C.

4. The catalyst according to claim 2 wherein the emissions released by plants are made to pass over a fixed bed kept at temperatures between 600° and 900° C.

5. The catalyst according to claim 1 wherein the catalyst comprises lanthanum oxide.

6. The catalyst according to claim 1 wherein the catalyst is supported on an inorganic porous oxide.

7. The catalyst according to claim 6 wherein the catalyst is supported on microspheroidal alumina.

8. The catalyst according to claim 7 wherein the catalyst is supported on granules which have the shape of perforated cylinders or with one or more lobes having through holes parallel to the axis of the granule.

9. The process for preparing the catalyst according to claim 6 wherein the support is first impregnated with an aqueous solution of a salt of lanthanum or other rare earth metal, dried and then calcinated at temperatures between 450° and 600° C. and subsequently impregnated with a solution of a cobalt and manganese salt and then, after drying, calcinated at temperatures between 500° and 750° C.

10. A method of using a catalyst of claim 1 comprising removing a nitrogen protoxide from a gaseous mixture with mixed oxides of cobalt, manganese and a rare earth metal present in the following proportions expressed as percentage by weight of CoO, MnO and rare earth oxide wherein the metal is at lowest valence state: CoO 22-30%, MnO 38-56% and rare earth metal oxide 22-32%.

11. The method of using a catalyst according to claim 10, wherein the rare earth metal oxide of the mixed oxide is lanthanum oxide and/or cerium oxide.

12. The method of using a catalyst according to claim 10, wherein the nitrogen protoxide is removed from the emissions of plants of nitric acid and adipic acid.

\* \* \* \* \*